Dec. 26, 1961  R. D. HOLMES  3,014,306
BUTT END CONSTRUCTION FOR FISHING ROD
Filed July 3, 1958
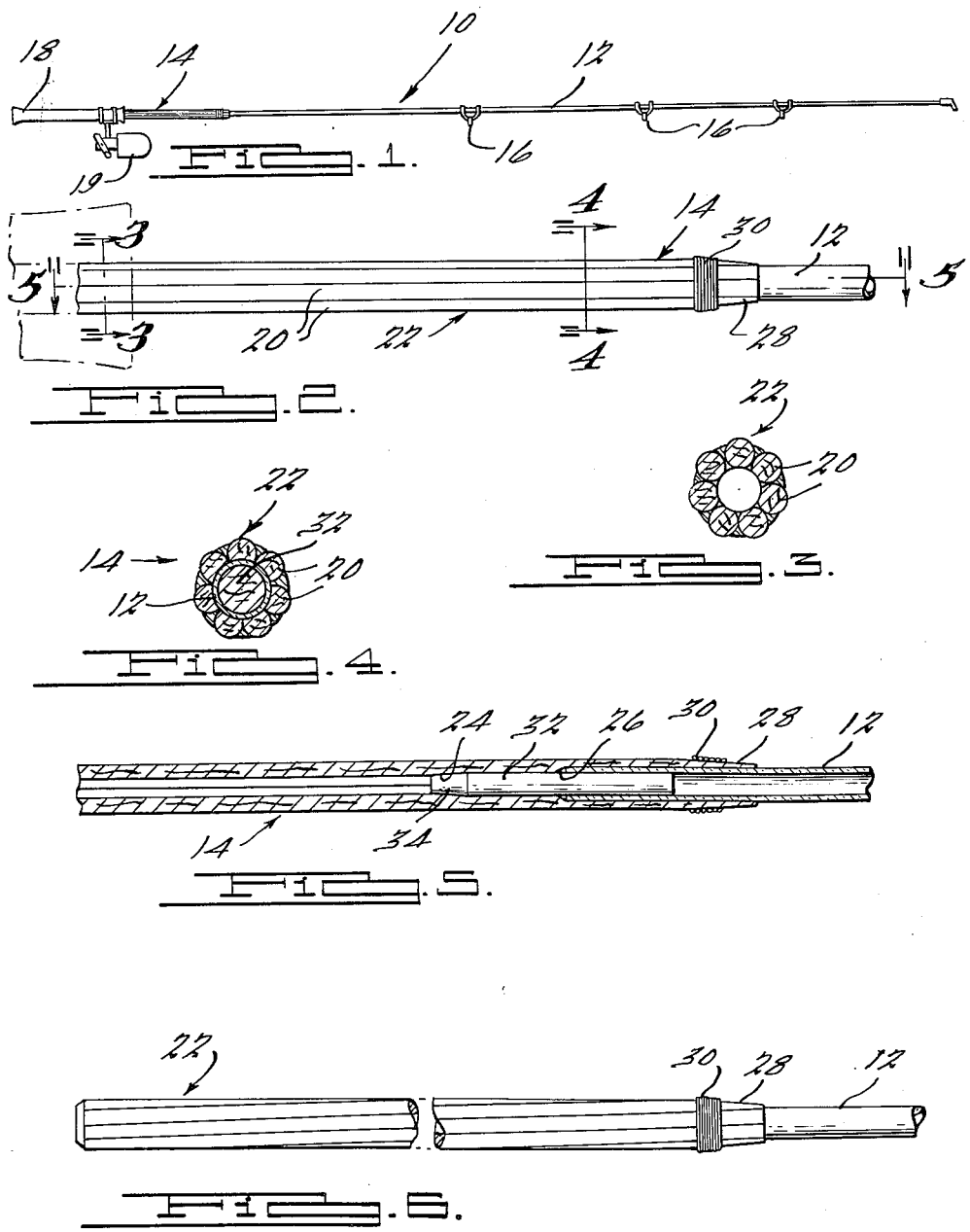
INVENTOR.
Robert Dean Holmes
BY
Harness, Dickey & Pierce
ATTORNEYS

United States Patent Office 3,014,306
Patented Dec. 26, 1961

3,014,306
BUTT END CONSTRUCTION FOR FISHING ROD
Robert Dean Holmes, 3604 Navajo Indian Trail,
Monroe, Mich.
Filed July 3, 1958, Ser. No. 746,385
2 Claims. (Cl. 43—23)

This invention relates to fishing rods and particularly to a butt end construction for a lightweight fishing rod, such as a spinning rod.

One of the more popular spinning rods of today is comprised of an elongated tapered glass rod or shaft which fits within and is secured to a butt end portion which is also made of glass, but is relatively shorter and stiffer than the shaft. A cork handle or grip and a spinning reel are mounted on the butt end portion to complete the assembly. The end of the rod formed by the butt end portion is, of course, generally referred to as the butt end, and the other end of the rod formed by the tapered glass shaft is generally referred to as the tip.

Experience has proved that spinning rods seldom break near the tip but generally break near the butt end. Therefore, the butt end portion must be sufficiently stiff and strong to withstand the breaking forces applied thereto by the maximum size fish that would normally be encountered when using a spinning rod of this type.

Making the butt end portion stiffer and stronger also improves its ability to dampen the oscillations of the tip of the rod after the cast has been made, which is sometimes referred to as the recovery characteristic of the rod, but also increases the weight of the rod and greatly reduces the action of the tip of the rod. Consequently, a compromise must be reached between the desired strength and the desired action and weight of the rod.

It is one object of the present invention to provide a butt end portion for a spinning rod that improves the action and recovery of the tip of the rod.

It is another object of the present invention to provide a spinning rod which is relatively stronger and lighter than previous rods, as well as, having an improved action and recovery at the tip of the rod.

It is a further object of the present invention to provide a spinning rod having the above-mentioned features and advantages which is simple and economical to manufacture, and rugged and effective in use.

Other objects, features and advantages of the present invention will become apparent from the following detailed description taken in conjunction with the accompanying drawing, in which:

FIGURE 1 is a side view of a spinning rod embodying features of the present invention;

FIG. 2 is an enlarged broken side view of the butt end portion of the spinning rod of FIG. 1;

FIG. 3 is an enlarged sectional view of the structure illustrated in FIG. 2 taken along the line 3—3 thereof;

FIG. 4 is an enlarged sectional view of the structure illustrated in FIG. 2 taken along the line 4—4 thereof;

FIG. 5 is a view of the structure illustrated in FIG. 2 taken along the line 5—5 thereof; and FIG. 6 is a side view similar to that of FIG. 2 of a butt end portion illustrating a modification of the present invention.

Referring to FIG. 1, one embodiment of the present invention is comprised of a spinning rod 10 having a tapered glass shaft 12 having the left end thereof secured within the right end of a butt end portion 14. The shaft 12 is provided with the usual eyelets 16 through which the fishing line is threaded, a grip 18 made of cork or the like is fixed on the end of the butt end portion, and a spinning reel 19 is mounted on the grip 18 near the right end thereof.

A spinning rod as just described is generally an extremely lightweight rod which derives its name from the fact that it is used in connection with a spinning reel wherein the fishing line is payed out in an axial direction from a stationary spool. The desired characteristics of such spinning rods are lightness, strength for resisting breaking when fighting a fish, and good action and recovery of the tip of the rod when casting. The term "action" is the word of art used by fishermen to describe the feel and flexibility of the tip of the shaft 12 when casting, and the term "recovery" is the word of art used to describe the ability of the rod and particularly the butt end portion 14 to dampen the oscillation of the tip after a cast has been made.

The present invention provides a new and unique butt end portion which improves upon all of the aforementioned desirable characteristics of spinning rods and provides a rod which weighs approximately 2.08 ounces, with improved strength against breaking and improved action and recovery of the tip of the rod. Although the butt end construction of the present invention is particularly suited for use with lightweight spinning rods as described, it will be readily appreciated from the following description that it also is well suited for use with other fishing rods, and, therefore, it is to be specifically understood that the present invention is not limited to use with spinning rods only.

Referring to FIGS. 2–5, the butt end portion 14 of the present invention is comprised of a plurality of elongated cylindrically shaped sticks 20 which are secured together to form a hollow tubular member 22. One method of making the tubular member 22 is to position each of the sticks 20 about a suitable mandrel having substantially the same outside diameter as the left end of the shaft 12 which is to fit within the right end of the butt end portion 14, and tightly wind nylon threads or the like about the sticks to hold them in position relative to one another by exerting an even radial force thereon. The mandrel may then be removed and a suitable bonding material coated on the inner surface of the sticks 20 to firmly secure and bond them together.

One material which has been found to be extremely suitable for securing the sticks 20 together is a well known Chrysler Corporation product sold under the trade name "Cycle Weld" and used by Chrysler for bonding brake linings to brake drums. When "Cycle Weld" bonding material is used, experience has proved that only the inner surface of the tubular member 22 need be coated to satisfactorily bond the sticks 20 together. After the sticks are bonded together, the nylon threads may be removed. Of course, many conventional waterproof cements or the like may also be used for bonding the sticks 20 together if desired and the outside of the tubular member 22 can also be coated to strengthen the bonding of the sticks.

The sticks 20 may be made out of any suitable material such as wood, for example, and when wood is used either bamboo or birch is preferred. After the tubular member 22 has been formed, the right end thereof is counterbored to provide a tapered internal shoulder 24 and a transverse shoulder 26 disposed between the tapered shoulder and the right end of the tubular member. The left end of the glass shaft 12 is disposed within the right end of the tubular member until the left end thereof abuts against the transverse shoulder 26, suitable cement or adhesive material being coated on the glass shaft to cement it on the inner wall of the tubular member.

One adhesive material that may be used is a rubberized ferrule material that never completely hardens. This bonds the glass shaft 12 and tubular member 22 together with a degree of resiliency which further improves the action and feel of the rod.

To complete the assembly, the grip 18 is positioned over the left end of the butt end portion 14 and secured thereto by a suitable waterproof cement or adhesive material, and the spinning reel 19 is mounted on the forward end of the grip. The right end of the butt end portion 14 is provided with a tapered portion 28 to provide a slightly more gradual change in the cross section between the shaft 12 and the butt end portion 14, and a nylon thread 30 is tightly wound thereabout to reinforce the tubular member to prevent the sticks 20 from separating when bending movements are applied thereto by the flexing or bending of the shaft 12.

With this construction, it has been found that the butt end portion is weakest at the transverse shoulder 26, and that if it should break, the break will tend to occur at the transverse shoulder due to the stress concentration at this point. To eliminate this stress concentration, an elongated dowel pin 32 is cemented within the left end of the glass shaft 12, as most clearly illustrated in FIGS. 4 and 5. The left end of the dowel pin is provided with a tapered end portion 34 which seats against the internal tapered shoulder 24 of the tubular member 22. With this construction, the bending forces between the glass shaft 12 and the butt end portion 14 are no longer concentrated solely at the transverse shoulder 26 but rather are distributed over a greater length to greatly increase the strength of the spinning rod and substantially reduce the possibility of its breaking.

The butt end portion 14 of this construction fulfills all the above-mentioned objects of the present invention by providing a lighter, stronger spinning rod having improved tip action and recovery. It is not clearly understood just why the butt end portion of the present invention made of a plurality of sticks 20 does so markedly improve on previous constructions, but it is believed that it is due to the fact that the individual sticks 20 tend to bend and flex independently to a limited degree and thus embody flexing and recovery characteristics not obtainable with a hollow tubular member made of solid wood, for example.

Referring to FIG. 6, a slightly different embodiment of the invention is disclosed wherein the tubular member 22 is twisted slightly after the bonding material has been applied thereto and before it has had an opportunity to fully set or harden, the twist being maintained until the bonding material fully sets so that the sticks 20 are permanently maintained in a twisted spiral attitude after the bonding material completely hardens. With this construction, the sticks 20 are in a sense preloaded or prestressed so that the butt end portion is in effect made somewhat stiffer.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A fishing rod comprising a tapered glass shaft, a tubular butt end member made of a plurality of cylindrical wooden sticks bonded together in substantially tangential contact in a single ringed configuration, said tubular butt end member having a forward portion including the ends of said wooden sticks for accepting said glass shaft, one end of said shaft being disposed within and cemented to the inner surface of said forward portion of said butt end member.

2. The subject matter as claimed in claim 1 wherein the tubular butt end portion has a pair of concentric shoulders located internally axially from the end of said forward portion and said tapered glass shaft is hollow and abuts said shoulder nearest said end of said forward portion, and including a dowel pin fixed within and projecting from said one end of the glass shaft and abutting said other shoulder in said forward portion of said butt end member, the dowel pin being cemeted to the inner surface of said forward portion for reducing the stresses in said forward portion in the region of said one end of the shaft.

References Cited in the file of this patent

UNITED STATES PATENTS

| | | |
|---|---|---|
| 169,181 | Leonard | Oct. 26, 1875 |
| 476,370 | Divine | June 7, 1892 |
| 735,471 | Crane | Aug. 4, 1903 |
| 1,160,490 | Bourickas | Nov. 16, 1915 |
| 1,385,149 | Rawson | July 19, 1921 |
| 1,748,223 | Herris | Feb. 25, 1930 |
| 1,792,034 | Reach | Feb. 10, 1931 |
| 1,997,853 | Buhrke et al. | Apr. 16, 1935 |
| 2,749,639 | D'Agnillo | June 12, 1956 |
| 2,749,643 | Scott | June 12, 1956 |
| 2,795,073 | Gronewold | June 11, 1957 |

FOREIGN PATENTS

| | | |
|---|---|---|
| 387,500 | Great Britain | Feb. 9, 1933 |
| 401,532 | Great Britain | Nov. 16, 1933 |
| 734,214 | Great Britain | July 27, 1955 |

OTHER REFERENCES

Popular Science, vol. No. 3, March 1956 (pages 213 to 215).

Popular Mechanics, vol. 105, No. 6, June 1956 (pages 166 to 167).